May 5, 1953 S. J. BUDLANE 2,637,377
LIQUID FUEL BURNING HEATER AND OPERATING SYSTEM THEREFOR
Filed Feb. 1, 1946 3 Sheets-Sheet 1

INVENTOR.
STANLEY J. BUDLANE

BY
Mueller and Mason

ATTORNEYS

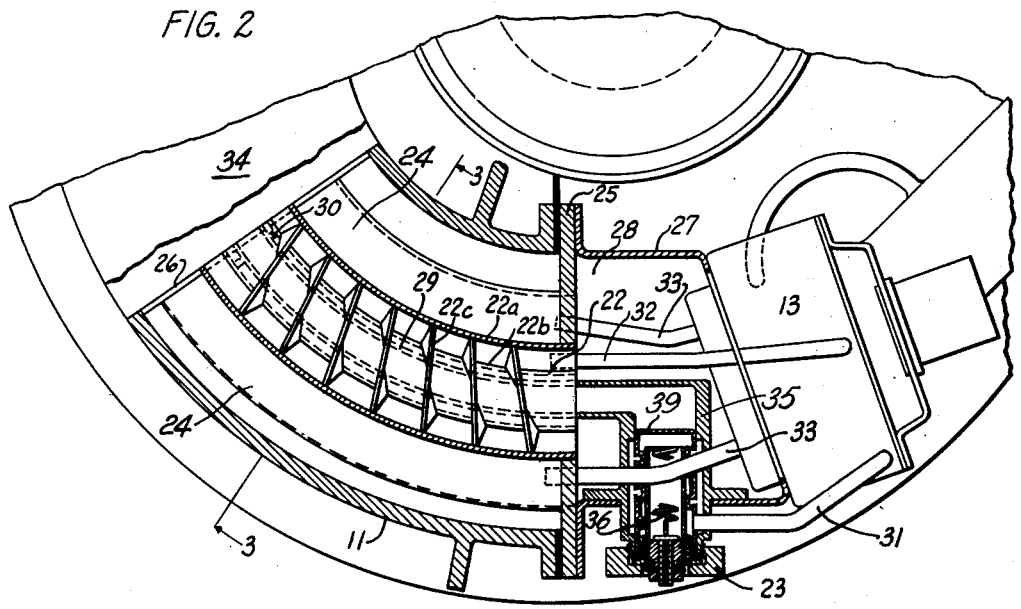
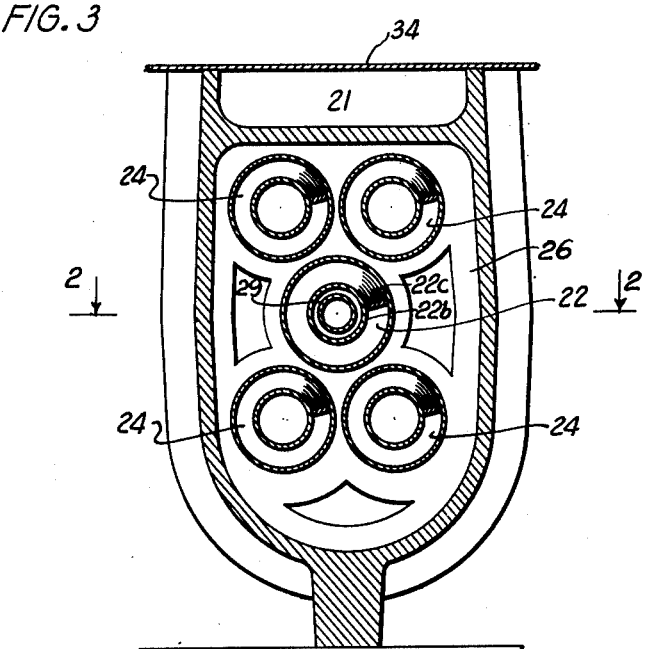

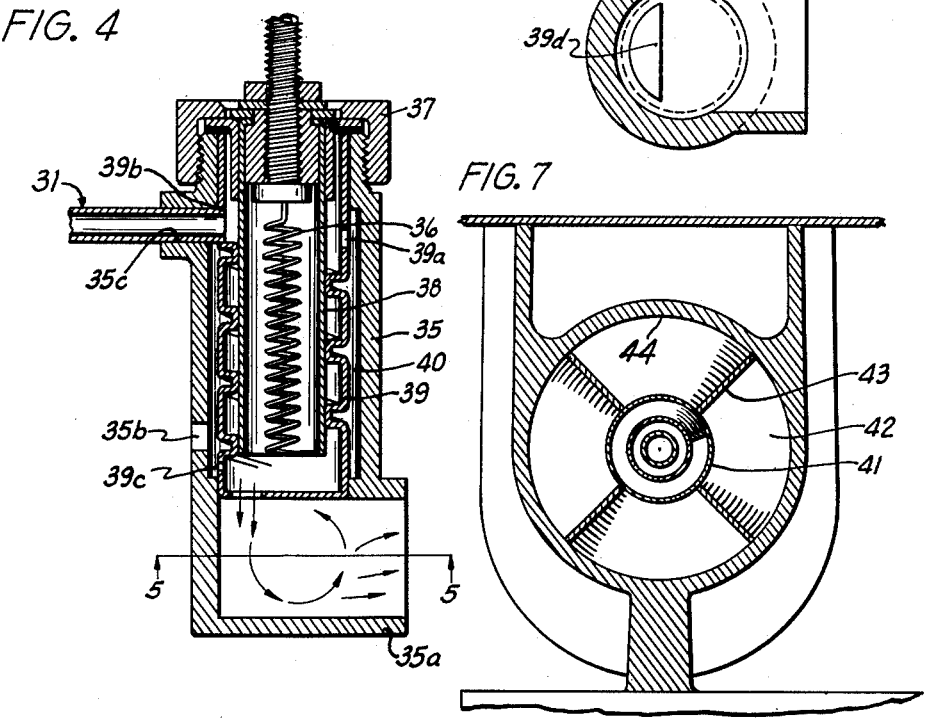
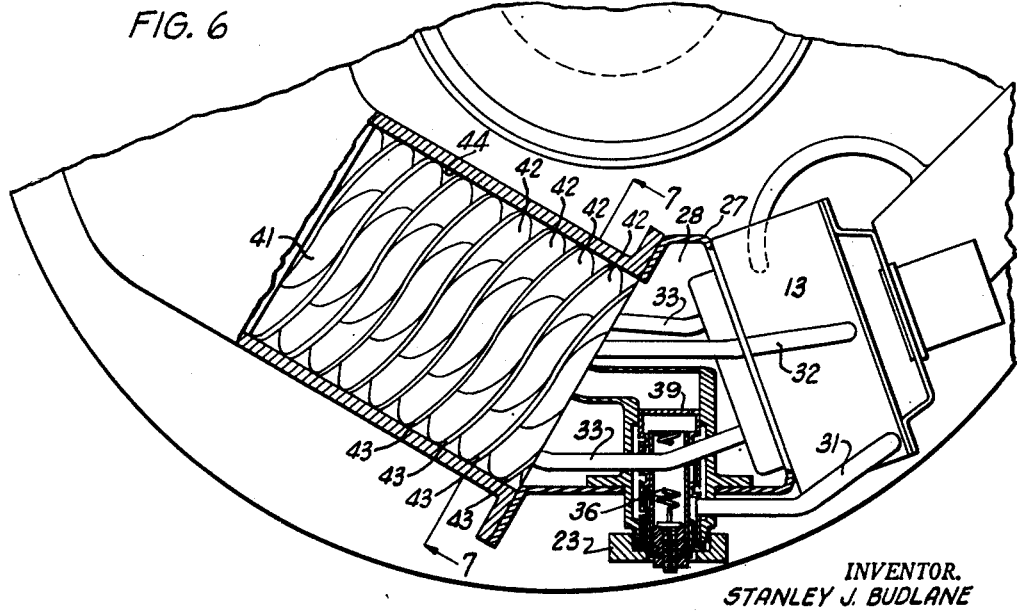

Patented May 5, 1953

2,637,377

UNITED STATES PATENT OFFICE 2,637,377

LIQUID FUEL BURNING HEATER AND OPERATING SYSTEM THEREFOR

Stanley J. Budlane, Chicago, Ill., assignor to Motorola, Inc., a corporation of Illinois Application February 1, 1946, Serial No. 644,694

10 Claims. (Cl. 158—53)

This invention relates generally to internal combustion systems and in particular to fuel conditioning apparatus for liquid fuel burning low pressure heaters for general portable use and for use in automobiles and other installations. Reference is made to my co-pending application entitled "Fuel Feeding System for Heaters," Serial No. 644,693, filed February 1, 1946, which has now issued as Patent Number 2,588,343, which discloses and claims a fuel feeding system suitable for internal combustion heaters such as those disclosed and claimed herein.

In the prior art, difficulties have been experienced in the design of internal combustion type heaters which will provide efficient operation over a wide range of varying heat outputs. Heaters used in automobiles and for general portable use must be capable of producing a small amount of heat in relatively cool weather and also be able to produce a large amount of heat in extremely cold weather. Heaters have been designed in which a variable heat output is provided by maintaining burning at a maximum but varying the heated air delivery from the heater. Furthermore, heaters have been designed in which the amount of fuel supplied to the heater is varied to provide varying heat outputs. In such heaters it is necessary to control the amount of combustion air supplied to the burner so that the right mixture for efficient burning is provided. This requires a complicated control system and a burner which will operate satisfactorily when supplied with widely varying amounts of fuel. Such devices have been very inefficient and have not been commercially satisfactory.

Attempts have been made to provide an internal combustion heater which will operate efficiently over a wide range of heat outputs by providing a plurality of burners in the heating device, one or more of which may operate at any time to provide a varying heat output with each individual burner being variable over only a portion of the entire range. Such multi-burner heating units have been used in large heating systems having complicated control systems, but have not been adapted for use in low pressure automobile and portable heaters, and available units are not suitable for this use merely by reduction in size.

Further problems involved in the design of fuel conditioning means for portable heaters is that a battery providing a small amount of power is generally the only power source available. In automobile heaters for example, the battery must provide the power required for all of the electrical equipment on the automobile in addition to the heater. Accordingly, a small amount of power is available to provide heat for the igniting means and power for drawing air through the combustion chamber of the heater and circulating the air to be heated over the combustion chamber. For this reason, it is desirable in a small heating system for automobile or portable use, to provide a multi-burner unit in which electrical heating and igniting means are required for only one of the burners which would operate as a pilot burner for igniting the additional burners. Also, it is necessary that the fuel conditioning unit be capable of conditioning the fuel for burning, utilizing only low pressures as sufficient power is not available for providing high pressure as is required for atomization of the fuel by pressure.

It is, therefore, an object of this invention to provide a fuel conditioning unit for an internal combustion heater having a plurality of burners, one or more of which may be in operation at any time.

It is a further object of this invention to provide a fuel conditioning unit for an internal combustion heater which provides for complete vaporization of the fuel, resulting in steady and complete burning thereof.

It is an additional object of this invention to provide a fuel conditioning and igniting unit having a plurality of burners which are of a compact construction and suitable for use in low pressure heaters for automobile and general portable use.

It is a still further object of this invention to provide a fuel conditioning unit including a pilot burner having an igniting unit therefor and a plurality of additional burners in which said pilot burner operates as an igniting unit for the additional burners.

A feature of this invention is the provision in an internal combustion heating system of a fuel conditioning unit having a plurality of passages which may be individually utilized for conditioning liquid fuel for burning prior to admission of the fuel into the combustion chamber.

A further feature of this invention is the provision of a fuel conditioning unit including a spiral passage and heating means therefor for pre-heating and vaporizing the fuel and for mixing the vaporized fuel with air to provide steady and complete burning thereof using only low pressures for moving said air and fuel mixture through said passage.

An additional feature of this invention is the provision of an igniter including an electrical heating coil for pre-heating and igniting the fuel therein to provide a flame which is used to preheat and ignite the fuel in a pilot burner.

A still further feature of this invention is the provision of a fuel conditioning unit having a pilot burner with an igniter for initiating combustion in said pilot burner and having a plurality of additional burners positioned adjacent to said pilot burner with the pilot burner serving to pre-heat and ignite the fuel in the additional burners.

Further objects, features, and advantages of my invention will be apparent from a consideration of the following description taken in connection with the accompanying drawings in which:

Fig. 2 is a view partly in section (taken on the line 2—2 in Fig. 3) showing the details of a fuel conditioning unit in accordance with this invention;

Fig. 3 is a cross-sectional view of the unit of Fig. 2 along the line 3—3;

Fig. 4 is a detailed view of the igniter unit;

Fig. 5 is a cross-sectional view of the igniter Fig. 4 along the line 5—5;

Fig. 6 is a section of a different version of the fuel conditioning unit and;

Fig. 7 is a cross-sectional view of the unit of Fig. 6 along the line 7—7.

Figure 1:
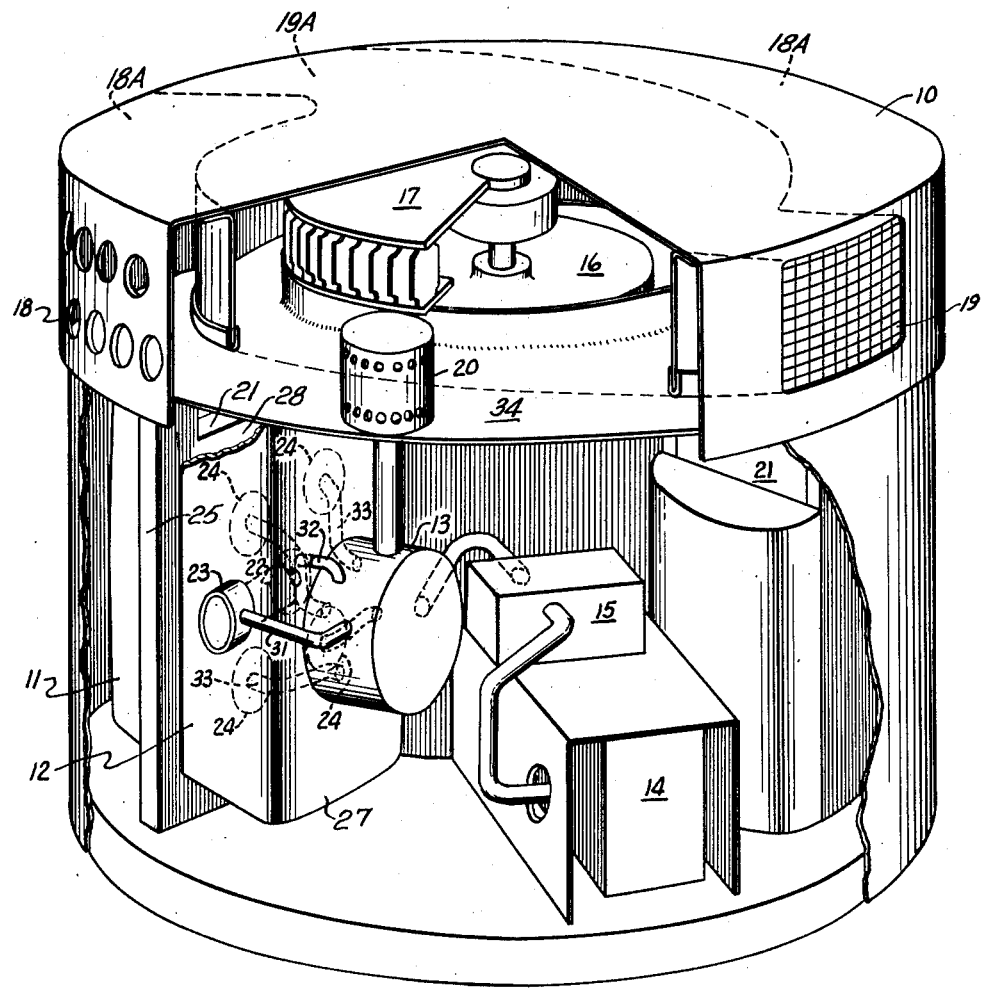
Fig. 1 is a perspective view showing the association of the fuel conditioning unit with the combustion chamber and fuel-feeding mechanism of an internal combustion heating unit.

In practicing my invention I provide a fuel conditioning unit for positioning in the combustion chamber of an internal combustion heater having a plurality of helical shaped passages for pre-heating and vaporizing the fuel and mixing the fuel with air prior to combustion thereof. The fuel conditioning unit may be applied to many types of internal combustion heaters, but I have applied the unit to the heater structure as disclosed in the Patent 2,492,654 of John A. Richards. The fuel conditioning unit includes a central pilot burner and four burners positioned around the pilot burner in close proximity thereto. An igniter unit is provided which includes a helical passage for fuel and air and an electrical heating coil for pre-heating and igniting the mixture. The flame from the igniter is introduced into the pilot burner for pre-heating fuel and air in a helical passage in the burner and thereafter igniting the same. The additional burners receive heat from the pilot burner so that fuel admitted to the burners is pre-heated, vaporized, and mixed with air while passing through the helical passages thereof, and ignited by the flame from the pilot burner upon entering the combustion chamber.

Referring now to the drawings, in Fig. 1 is shown a heater 10 having a combustion chamber 11 of curved configuration, a fuel conditioning and igniting unit 12, a selector unit 13 for providing fuel to the fuel conditioning unit, and a fuel pump 14 for providing fuel to the selector through a pressure regulator 15. A motor 16, disposed within a central space that is partially surrounded by the combustion chamber 11, is provided for driving fan 17 for circulating air to be heated about the combustion chamber and also for driving the fuel pump 14 and a suction fan (not shown) for drawing air through the combustion chamber. Openings 18 are provided in the heater housing for intake of air to be heated and openings 19 are provided for discharge of heated air. The selector unit 13 selectively regulates the feeding of liquid fuel through the fuel lines 31, 32 and 33 to various burner units (subsequently described) in accordance with heat requirements. It may include a number of needle valves or the like for respectively opening and closing the fuel lines.

The combustion chamber 11 is of substantially C-shaped configuration and is arranged in concentric relation with the heater housing, which is of cylindrical shape. The segmental space between the ends of this combustion chamber accommodates the various parts 12, 13, 14 and 15 just described. Incoming air passes through the openings 18 to intake air spaces 18A (Fig. 1) within the heater housing. There is sufficient clearance between the outer periphery of the combustion chamber 11 and the heater housing to afford an annular passage for the circulation of air from the intake spaces 18A down past the outside of the combustion chamber 11 and thence upwardly through the space between the motor 16 and the inner periphery of the combustion chamber 11 to a discharge air space 19A that communicates with the discharge openings 19. A temperature responsive unit 20 is positioned in the air intake passage for controlling the selector unit 13 in accordance with the temperature of the intake air. The temperature-responsive unit 20 accomplishes this by selectively actuating the fuel valves within the unit 13 in accordance with the amount of expansion or contraction of a fluid within the unit 20 having a high temperature coefficient of expansion. The pressure regulator 15 maintains the pressure of the liquid fuel fed by the pump 14 to the selector unit 13 at a substantially constant value. The combustion chamber 11 includes a passage 21 at the top portion thereof for intake of air to be used in combustion (Fig. 1 and Fig. 3). The passage 21 is open at one end as illustrated in Fig. 1 and communicates at the other end with the chamber 28 which supplies combustion air for the fuel conditioning unit as will be described. The air travelling through the passage in the combustion chamber is pre-heated prior to entering the fuel conditioning unit. The air, after being preheated, is furnished to the burners and igniter in a manner to be described in connection with Figs. 2 and 3. For further clarification of the details of constructoin of the heater structure reference is made to U. S. Patent No. 2,492,654, identified above.

Referring now to Figs. 2 and 3, the fuel conditioning unit including a pilot burner 22, an igniter 23, and four additional burners 24, is shown positioned in a C-shaped combustion chamber 11. The igniter will be described in detail in connection with Figs. 4 and 5. The burners are supported at their intake ends by plate 25 which forms a closure for the combustion chamber and has openings therein for the burners. The burners are supported within the combustion chamber by a spider member 26. A cup-shaped member 27 fits over the plate 25 and in addition to supporting the selector 13 and igniter 23, defines a chamber 28 for air for the fuel conditioning unit which has been pre-heated in the passage 21. The burners 22 and 24 are coextensive, as indicated in Fig. 2. The pilot burner 22 includes an outer curved tubular member 22a and a tubular member 22b of smaller diameter positioned therein and spaced therefrom by helix 22c to form a continuous helical or spiral passage between the tubular members 22a and 22b. An additional tubular member 29 leading from the igniter 23 is positioned inside the pilot burner and spaced within the tubular member 22b by spider member 30. The spider member has openings therein permitting air to pass between the tubular members 22b and 29. The flame produced by the igniter 23 is carried through the tubular member 29 to heat the pilot burner and particularly, to heat the spiral passage contained therein.

The additional tubular members 24 are positioned in the combustion chamber as shown in Fig. 3. These burners include tubular members with a helix therebetween forming a spiral passage as in the pilot burner. There is no connection between the igniter and these burners as such a connection is not necessary for operation of the burners as will be explained later. The selector unit 13 includes a fuel line 31 leading to the igniter, fuel line 32 for the pilot burner, and additional fuel lines 33 for the additional burners. The fuel lines 32 and 33 are arranged to feed fuel to the spiral passages in the burners. The air which has been admitted from one of the intake air spaces 18a to the arcuate horizontal passage 21, between the combustion chamber 11 and the annular plate member 34 (Figs. 1 and 3) after passing around the combustion chamber, enters the air chamber 28 and from there enters the spiral passages in the burners for mixing with the fuel and also enters the central passage in the burners.

Referring now to Figs. 4 and 5, it will be seen that the means for conditioning fuel in the igniter is similar to the means provided in the burners themselves. The igniter is composed of a housing 35 of tubular shape, having a right angle turn 35a at the end thereof. Openings 35b for entrance of air and 35c for entrance of fuel are provided therein. An electrical heating element 36 is supported in the housing and secured to the open end thereof by the annular member 37. A tubular member 38 is positioned around the electrical heating element and a second tubular member 39 is positioned around the tubular member 38. The member 39 has a spiral ridge extending inwardly therefrom contacting the tubular member 38 to form a spiral passage between the walls of the tubular members. An air chamber 40 is formed between the member 39 and housing 35 into which air enters through opening 35b and which furnishes air to the spiral passage through openings 39a. An opening 39b is provided in tubular member 39, registering with an opening 35c in the housing for connection of the fuel line 31 from the selector unit which provides fuel to the spiral passage. Additional openings 39c are provided in the tubular member 39 at the end of the spiral passage for the entry of additional air from the chamber 40. The end of the member 39 is substantially closed with an arcuate-shaped port 39d therein at which burning takes place as shown in Fig. 5.

The operation of the igniter unit and burner units will now be explained. The units are positioned as shown in Fig. 2 with the heating element 36 connected to a suitable source of electrical energy to heat the helical or spiral passage positioned thereabout. Fuel enters the spiral passage defined by the member 39 (see also Fig. 4) through the fuel line 31 from the selector. Air from the chamber 28 enters the housing 35 through opening 35b into chamber 40 from which it is fed through the openings 39a into the spiral passage. Here the fuel is vaporized and mixed with the air as the mixture traverses the heated spiral passage. At the end of the spiral passage additional air enters through openings 39c and mixes with the air and fuel mixture and the combination is ignited by the heating coil 36. The burning takes place at the arcuate-shaped port 39d, where a swirling action is effected with part of the burning mixture returning to re-ignite additional gas and fuel entering through the port and the remainder going through the right angle turn 35a as shown by the arrows in Fig. 4. After burning has been initiated at the igniter, the heat produced by the burning mixture will retain the igniter housing in a heated condition for heating the gas and fuel in the spiral passage and accordingly the electrical heating coil may be disconnected.

The flame from the igniter is carried through tube 29 in the pilot burner (Fig. 2) to heat the spiral passage therein. Fuel is furnished to the spiral passage of the pilot burner through fuel feed line 32 from selector 13. Air from the chamber 28 also enters the spiral passage and as the air and fuel traverse the passage the fuel is vaporized and mixed with the air. Additional air from the space 28 enters the burner through tubular member 22b in the space around the tubular member 29, and is united with the air and fuel mixture at the end of the spiral passage to lean the mixture for complete and efficient burning thereof. At the point where it is leaned, the mixture is ignited by the flame from the igniter extending from the end of tube 29. Heat from the pilot burner heats the adjacent burners 24 so that when fuel is fed to these burners through the fuel feed lines 33 from selector 13, fuel and air passing through the spiral passages is mixed in the same manner as previously described with reference to the pilot burner. Also, additional air passes through the inner tubular members of the burners to be united with the fuel and gas mixture at the end of the burners where the complete mixture is ignited by the flame from the pilot burner 24. The selector 13 controls the supply of fuel to the burners but does not exercise any control over the air supplied thereto. When one or more of the burners 24 are not in operation, air from the chamber 28 continues to enter the burners and passes through the combustion chamber. This excess air does not affect the operating burners as it will not come in contact with the mixture in these burners until such mixture has been ignited. That is to say, each of the burner passages keeps the air passing therethrough isolated from the other burner passages so that there is no dilution of the fuel and air mixture in any one passage by the air admitted to any of the other passages. This feature eliminates the need of a system for controlling the supply of air in accordance with the fuel supply which would be required if a single burner was used and accordingly results in a less complicated structure.

In Figs. 6 and 7 a modified version of the fuel conditioning unit is shown. Due to the similarity of this unit with the unit of Figs. 2 and 3 a detailed description will not be given. The same reference characters used in Figs. 2 and 3 are used to identify corresponding components of this unit. In this modification a central pilot burner 41 is provided which is substantially identical to the burner 22 of Fig. 2. The flame from the igniter extends in a tube through the center of the burner and air and fuel entering the burner traverses a spiral passage in the same manner as in Fig. 2. Four additional burning passages 42 are provided by the four interlaced helical members 43 positioned about the pilot burner 40 and within the cylindrical wall 44. The structure of this unit is apparent from an examination of Figs. 6 and 7. The passages 42 are heated by the heat from the pilot burner 41. Air introduced from the air chamber 23 and fuel introduced through the fuel lines 33 from the selector 13, enter the spiral passages and are mixed for burning in the manner previously described. The mixture from the passages 42, as it enters the combustion chamber, is ignited by the flame from the pilot burner as previously described.

From the foregoing description it can be seen that a compact and efficient fuel conditioning unit, having a plurality of burners, is provided which is suitable for use in small heaters for automobile or general portable use. The spiral passages provided in the igniter and burner units, having heating means inside, provide for complete vaporization of the liquid fuel and thorough mixing with air without the use of high pressure or strong suction. This results in steady, complete, and efficient burning of the fuel. Further, the burners are arranged in such a manner that after the pilot burner has been ignited, the additional burners will operate when supplied with fuel without individual igniter units as the pilot burner serves as an igniter for the additional burners.

Although the invention has been described in connection with specific embodiments thereof, it is evident that other modifications and variations are possible within the intended scope of the invention. Accordingly, the invention is not to be limited to the structures shown but only by the scope of the appended claims.

I claim:

1. A burner assembly for a low pressure liquid fuel burning heater including in combination, a pilot burner and a plurality of additional burners, said pilot burner including a heat conductive outer cylindrical wall and means within said wall forming a helical passage having at least one open end for conditioning liquid fuel therein, a second cylindrical wall positioned about said pilot burner, a plurality of interlaced helixes positioned between said outer cylindrical wall of said pilot burner and said second cylindrical wall and forming a plurality of helical burner passages, means for supplying air to said helical passage of said pilot burner and to said additional helical burner passages, means for continuously supplying liquid fuel to said helical passage of said pilot burner and for selectively supplying liquid fuel to said additional helical burner passages, an igniting unit operatively connected to said pilot burner for heating the fuel and air traversing the helical passage thereof and for igniting the mixture at the open end of said helical passage, said additional helical burner passages being in heat conducting relation with said pilot burner so that the fuel therein is vaporized and mixed with air and the resulting mixture is ignited by the ignited fuel from said pilot burner.

2. A fuel burner assembly for low pressure liquid fuel burning apparatus including in combination, a plurality of main burner means each having a passage terminating in a port, pilot burner means having a passage extending substantially along the length of the aforesaid main burner passages in heating relation therewith and terminating in a pilot burner port in igniting relation with all of said main burner ports, an igniter unit including an electric igniting element and an air inlet port adjacent said igniting element and having a passage extending substantially along the length of said pilot burner passage in heating relation therewith and terminating in igniting relation with said pilot burner port, means for introducing air under pressure to said main and to said pilot burner passages and to said air inlet port of said igniter unit, means for supplying liquid fuel to said igniter unit adjacent the igniting element thereof to develop a flame in said igniter unit passage for heating said pilot burner passage, means for supplying liquid fuel to the heated pilot burner passage to produce a combustible air-and-fuel mixture in said pilot burner passage, said mixture being ignited at said pilot burner port by said igniter flame to develop a pilot flame at said pilot burner port and within said pilot burner passage for heating said main burner passages, and a temperature responsive fuel selector for selectively supplying liquid fuel to said main burner passages rearwardly of the ports thereof whereby said fuel passes over substantially the length of said main burner passages.

3. A fuel burner assembly for low pressure liquid fuel burning apparatus including in combination, a plurality of main burner means respectively having passages terminating in a common plane in ports, pilot burner means having a passage extending substantially along the length of the aforesaid main burner passages in heating relation therewith and terminating in said common plane in a pilot burner port in igniting relation with all of said main burner ports, an igniter unit including an electric igniting element and an air inlet port adjacent said igniting element and having a passage extending substantially along the length of said pilot burner passage in heating relation therewith and terminating in said common plane in igniting relation with said pilot burner port, means for introducing air under pressure to said main and to said pilot burner passages and to said air inlet port of said igniter unit, means for supplying liquid fuel to said igniter unit adjacent the igniting element thereof to develop a flame in said igniter passage for heating said pilot burner passage, means for supplying liquid fuel to the heated pilot burner passage to produce a combustible air-and-fuel mixture in said pilot burner passage, said mixture being ignited at said pilot burner port by said igniter flame to develop a pilot flame at said pilot burner port and within said pilot burner passage for heating said main burner passages, and a temperature responsive fuel selective for selectively supplying liquid fuel to said main burner passages rearwardly of the ports thereof whereby said fuel passes over substantially the length of said main burner passages.

4. A fuel burner assembly for low pressure liquid fuel burning apparatus including in combination, a plurality of main burner means each having a passage terminating in a port, pilot burner means having a passage extending substantially along the length of the aforesaid main burner passages in heating relation therewith and terminating in a port in igniting relation with all of said main burner ports, an igniter unit including an electric igniting element and an air inlet port adjacent said igniting element and having a passage extending substantially along the length of said pilot burner passage coaxially therein in heating relation therewith and terminating in igniting relation with said pilot burner port, means for introducing air under pressure to said main and to said pilot burner passages and to said air inlet port of said igniter unit, means for supplying liquid fuel to said igniter unit adjacent the igniting element thereof to develop a flame in said igniter passage for heating said pilot burner passage, means for supplying liquid fuel to the heated pilot burner passage to produce a combustible air-and-fuel mixture in said pilot burner passage, said mixture being ignited at said pilot burner port by said igniter flame to develop a pilot flame at said pilot burner port and within said pilot burner passage for heating said main burner passages, and a temperature responsive fuel selector for selectively supplying liquid fuel to said main burner passages rearwardly of the ports thereof whereby said fuel passes over substantially the length of said main burner passages.

5. A low pressure internal combustion heating system including in combination, a combustion chamber, a conditioning chamber adjacent said combustion chamber and communicating therewith, a plurality of main burner means supported within said conditioning chamber each having a tube terminating in a port in communication with said combustion chamber, pilot burner means supported within said conditioning chamber having a tube extending substantially along the length of the aforesaid main burner tubes in heating relation therewith and terminating in a port in communication with said combustion chamber and in igniting relation with all of said main burner ports, an igniter unit including an electric igniting element and an air inlet port adjacent said igniting element and having a tube extending into said fuel conditioning chamber substantially along the length of said pilot burner tube in heating relation therewith and terminating in said combustion chamber in igniting relation with said pilot burner port, means for introducing air under pressure to said main and to said pilot burner tubes and to said air inlet port of said igniter unit, means for supplying liquid fuel to said igniter unit adjacent the igniting element thereof to develop a flame in said igniter tube for heating said pilot burner tube, means for supplying liquid fuel to the heated pilot burner tube to produce a combustible air-and-fuel mixture in said pilot burner tube, said mixture being ignited at said pilot burner port by said igniter flame to develop a pilot flame at said pilot burner port and within said pilot burner tube for heating said main burner tubes, and a temperature responsive fuel selector for selectively supplying liquid fuel to said main burner tubes rearwardly of the ports thereof whereby said fuel passes over substantially the length of said main burner tubes.

6. A fuel burner assembly for low pressure liquid fuel burning apparatus including in combination, a plurality of main burner means each having a passage terminating in a port and a contiguous air passage terminating in a common plane with said first mentioned passage, pilot burner means having a passage extending substantially along the length of the aforesaid main burner passages in heating relation therewith and terminating in a pilot burner port in igniting relation with all of said main burner ports, an igniter unit including an electric igniting element and an air inlet port adjacent said igniting element and having a passage extending substantially along the length of said pilot burner passage in heating relation therewith and terminating in igniting relation with said pilot burner port, means for introducing air under pressure to said main and to said pilot and to said contiguous air passages and to said inlet port of said igniter unit, means for supplying liquid fuel to said igniter unit adjacent the igniting element thereof to develop a flame in said igniter unit passage for heating said pilot burner passage, means for supplyng liquid fuel to said heated pilot burner passage to produce a combustible air-and-fuel mixture in said pilot burner passage, said mixture being ignited at said pilot burner port by said igniter flame to develop a pilot flame at said pilot burner port and within said pilot burner passage for heating said main burner passages, and a temperature responsive fuel selector for selectively supplying liquid fuel to said main burner passages rearwardly of the ports thereof whereby said fuel passes over substantially the length of said main burner passages.

7. A fuel burner assembly for low pressure liquid fuel burning apparatus including in combination, a plurality of main burner means each having a tube terminating in a port, pilot burner means having a tube extending substantially along the length of the aforesaid main burner tubes in heating relation therewith and terminating in a pilot burner port in igniting relation with all of said main burner ports, an igniter unit including an electric igniting element and an air inlet port adjacent said igniting element and having a tube extending substantially along the length of said pilot burner tube in heating relation therewith and terminating in igniting relation with said pilot burner port, means for introducing air under pressure to said main and to said pilot burner tubes and to said air inlet port of said igniter unit, means for supplying liquid fuel to said igniter unit adjacent the igniting element thereof to develop a flame in said igniter tube for heating said pilot burner tube, means for supplying liquid fuel to the heated pilot burner tube to produce a combustible air-and-fuel mixture in said pilot burner tube, said mixture being ignited at said pilot burner port by said igniter flame to develop a pilot flame at said pilot burner port and within said pilot burner tube for heating said main burner tubes, and a temperature responsive fuel selector for selectively supplying liquid fuel to said main burner tubes rearwardly of the ports thereof whereby said fuel passes over substantially the length of said main burner tubes.

8. A fuel burner assembly for low pressure liquid fuel burning apparatus including in combination, main burner means having a heat conductive tube terminating in a port, pilot burner means having a heat conductive tube extending coaxially within said main burner tube in heating relation therewith and terminating in a port in igniting relation with said main burner port, an igniter unit including an electric igniting element and an air inlet port adjacent said igniting element and having a heat conductive tube extending coaxially within said pilot burner tube in heating relation therewith and terminating in igniting relation with said pilot burner port, means for introducing air under pressure to said main and pilot burner tubes and to said air inlet port of said igniter unit, means for supplying liquid fuel to said igniter unit adjacent the igniting element thereof to develop an igniter flame in said igniter tube for heating said pilot burner tube, means for supplying liquid fuel to said heated pilot burner tube to produce a combustible air-and-fuel mixture in said pilot burner tube, said mixture being ignited at said pilot burner port by said igniter flame to develop a pilot flame at said pilot burner port and within said pilot burner tube for heating said main burner tube, and means for supplying liquid fuel to said heated main burner tube rearwardly of the port thereof to produce a combustible air-and-fuel mixture therein for ignition at said main burner port by said pilot flame.

9. A fuel burner assembly for low pressure liquid fuel burning apparatus including in combination, main burner means having a heat conductive tube terminating in a port and having at least one helical passage therein, a pilot burner means having a heat conductive tube extending coaxially within said main burner tube in heating relation therewith and terminating in a port in igniting relation with said main burner port, an igniter unit including an electric igniting element and an air inlet port adjacent said igniting element and having a heat conductive tube extending coaxially within said pilot burner tube in heating relation therewith and terminating in igniting relation with said pilot burner port, means for introducing air under pressure to said main and pilot burner tubes and to said air inlet port of said igniter unit, means for supplying liquid fuel to said igniter unit adjacent the igniting element thereof to develop an igniter flame in said igniter tube for heating said pilot burner tube, means for supplying liquid fuel to said heated pilot burner tube to produce a combustible air-and-fuel mixture in said pilot burner tube, said mixture being ignited at said pilot burner port by said igniter flame to develop a pilot flame at said pilot burner port and within said pilot burner tube for heating said main burner tube, and means for supplying liquid fuel to said heated main burner tube rearwardly of the port thereof to produce a combustible air-and-fuel mixture therein for ignition at said main burner port by said pilot flame.

10. A fuel burning assembly for low pressure liquid fuel burning apparatus including in combination, main burner means having a heat conductive tube terminating in a port and having a series of coaxial contiguous helical passages therein, a pilot burner means having a heat conductive tube extending coaxially within said main burner tube in heating relation therewith and terminating in a port in igniting relation with said main burner port, an igniter unit including an electric igniting element and an air inlet port adjacent said igniting element and having a heat conductive tube extending coaxially within said pilot burner tube in heating relation therewith and terminating in igniting relation with said pilot burner port, means for introducing air under pressure to said main and pilot burner tubes and to said air inlet port of said igniter unit, means for supplying liquid fuel to said igniter unit adjacent the igniting element thereof to develop an igniter flame in said igniter tube for heating said pilot burner tube, means for supplying liquid fuel to said heated pilot burner tube to produce a combustible air-and-fuel mixture in said pilot burner tube, said mixture being ignited at said pilot burner port by said igniter flame to develop a pilot flame at said pilot burner port and within said pilot burner tube for heating said main burner tube, and means for supplying liquid fuel to said heated main burner tube rearwardly of the port thereof to produce a combustible air-and-fuel mixture therein for ignition at said main burner port by said pilot flame.

STANLEY J. BUDLANE.

References Cited in the file of this patent

UNITED STATES PATENTS

| Number | Name | Date |
|---|---|---|
| 1,529,906 | Morris | Mar. 17, 1925 |
| 1,646,503 | Steward | Oct. 25, 1927 |
| 1,656,486 | Huntington et al. | Jan. 17, 1928 |
| 1,669,551 | Blaskewitz | May 15, 1928 |
| 1,832,220 | Kerrihard et al. | Nov. 17, 1931 |
| 1,935,346 | Blanchard | Nov. 14, 1933 |
| 1,960,609 | Werner | May 29, 1934 |
| 1,971,208 | Butz | Aug. 21, 1934 |
| 2,047,871 | Hillhouse | July 14, 1936 |
| 2,073,552 | Curioni | Mar. 9, 1937 |
| 2,074,168 | Danuser et al. | Mar. 16, 1937 |
| 2,194,599 | Katz | Mar. 26, 1940 |
| 2,226,816 | Hepburn | Dec. 31, 1940 |
| 2,229,717 | Brace et al. | Jan. 28, 1941 |
| 2,399,234 | Kreisinger | Apr. 30, 1946 |
| 2,405,145 | Holthouse | Aug. 6, 1946 |
| 2,411,040 | Holthouse | Nov. 12, 1946 |
| 2,411,663 | McCollum | Nov. 26, 1946 |
| 2,418,882 | Holthouse | Apr. 15, 1947 |
| 2,421,370 | Budlane | June 3, 1947 |
| 2,443,707 | Korsgren | June 22, 1948 |